(12) United States Patent
Baugh (10) Patent No.: US 10,480,263 B1
(45) Date of Patent: Nov. 19, 2019

(54) METHOD OF PREPOSITIONING OF FRICTION DOGS FOR SKEWED ENGAGEMENT

(71) Applicant: Reel Power Licensing Corp., Oklahoma City, OK (US)

(72) Inventor: Benton Frederick Baugh, Houston, TX (US)

(73) Assignee: REEL POWER LICENSING CORP., Oklahoma City, OK (US)

( * ) Notice: Subject to any disclaimer, the term of this patent is extended or adjusted under 35 U.S.C. 154(b) by 0 days.

(21) Appl. No.: 16/042,026

(22) Filed: Jul. 23, 2018

Related U.S. Application Data (63) Continuation of application No. 15/274,014, filed on Sep. 23, 2016, now abandoned, which is a continuation of application No. 14/733,012, filed on Jun. 8, 2015, now abandoned, which is a continuation-in-part of application No. 14/515,491, filed on Oct. 15, 2014, now abandoned.

(51) Int. Cl.
*E21B 19/10* (2006.01)
*F16L 3/10* (2006.01)
*F16L 3/16* (2006.01)

(52) U.S. Cl.
CPC ............ *E21B 19/10* (2013.01); *F16L 3/1066* (2013.01); *F16L 3/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,472,535 A | * | 10/1969 | Kinley | E21B 19/10 188/67 |
| 3,552,673 A | * | 1/1971 | Evers | B65H 75/242 242/571.3 |
| 5,416,281 A | * | 5/1995 | Ogura | G01V 1/147 175/1 |

* cited by examiner

*Primary Examiner* — Cathleen R Hutchins
*Assistant Examiner* — Ronald R Runyan
(74) *Attorney, Agent, or Firm* — Phillips Murrah PC; Martin G. Ozinga (57) ABSTRACT

The method of using friction dogs for the skewed force amplifying gripping engagement of a circular member including positively prepositioning the friction dog in a predetermined position on a force wedging angled surface before the engagement with the circular member and the freedom to move along a skewed surface after the engagement to allow the force amplifying wedging action to occur.

5 Claims, 7 Drawing Sheets

METHOD OF PREPOSITIONING OF FRICTION DOGS FOR SKEWED ENGAGEMENT

CROSS-REFERENCE TO RELATED APPLICATIONS

This is a continuation-in-part of U.S. patent application Ser. No. 14/515,491 filed Oct. 15, 2014 currently pending and incorporated by reference herein.

TECHNICAL FIELD

This invention relates to the method of controlling the position of friction dogs in assemblies such as oilfield slips when they must engage a central pipe in a first direction and then be free to move in an alternate direction.

BACKGROUND OF THE INVENTION

Circular or tubular members such as pipe and umbilicals are frequently supported by friction dogs engaging them. Most conventionally the friction dogs are in the form of slip inserts with sharp teeth which bite into the surface of the circular or tubular members to effectively give them a very high coefficient of friction. Whereas typical steel on steel friction is presumed to be in the range of 0.1, sharp teeth are calculated to have a coefficient of friction of 0.5, although as they are biting into the circular member the number is likely much higher.

If a dependable grip is desired without sharp teeth to bite into and potentially damage the part being supported, some other method of increasing the friction against the supported member needs to be done. U.S. Pat. No. 6,820,705 shows a method of doing this whereby the force against the supported member is amplified by the wedging action of a surface on the back side of the friction dog which is at a skewed angle relative to the direction of approach of the friction dog to the supported member.

As is illustrated in '705, the coefficient of friction on the back side of the slip is enhanced by the typical eight degree taper of the supporting surface. The coefficient of friction against the supported member must be enhanced more by the wedging action of that invention for the supported member to be safely supported.

The wedging action of the '705 slips requires that the friction dogs must be properly positioned before engagement for approach to the supported member. Once initially engaged with the supported member, the friction dog must then be free to move laterally along the skewed surface to effect the amplification. The support must have a combination of being fixed when, plus being flexible when needed.

Prior attempts to solve this problem have been to do the prepositioning by hand or to not control the prepositioning and simply hope it works out satisfactorily.

The need for properly, automatically, and suredly prepositioning the friction dog before engagement with the supported member and then allowing relatively free lateral movement after engagement have not been satisfactorily resolved before this invention.

BRIEF SUMMARY OF THE INVENTION

The object of this invention is to provide a method of prepositioning a friction dog before engagement with a supported member and then allowing relatively free lateral movement of the friction dog after engagement with the supported member.

A second object of this invention is to provide a method of offsetting frictional hysteresis to get all the way back to the prepositioning position from either direction after engagement of the supported member and before the next engagement.

A third objective of this invention is to provide supporting engagement with sensitive equipment such as subsea umbilicals without damaging the umbilicals.

DETAILED DESCRIPTION OF THE INVENTION

Figure 1:
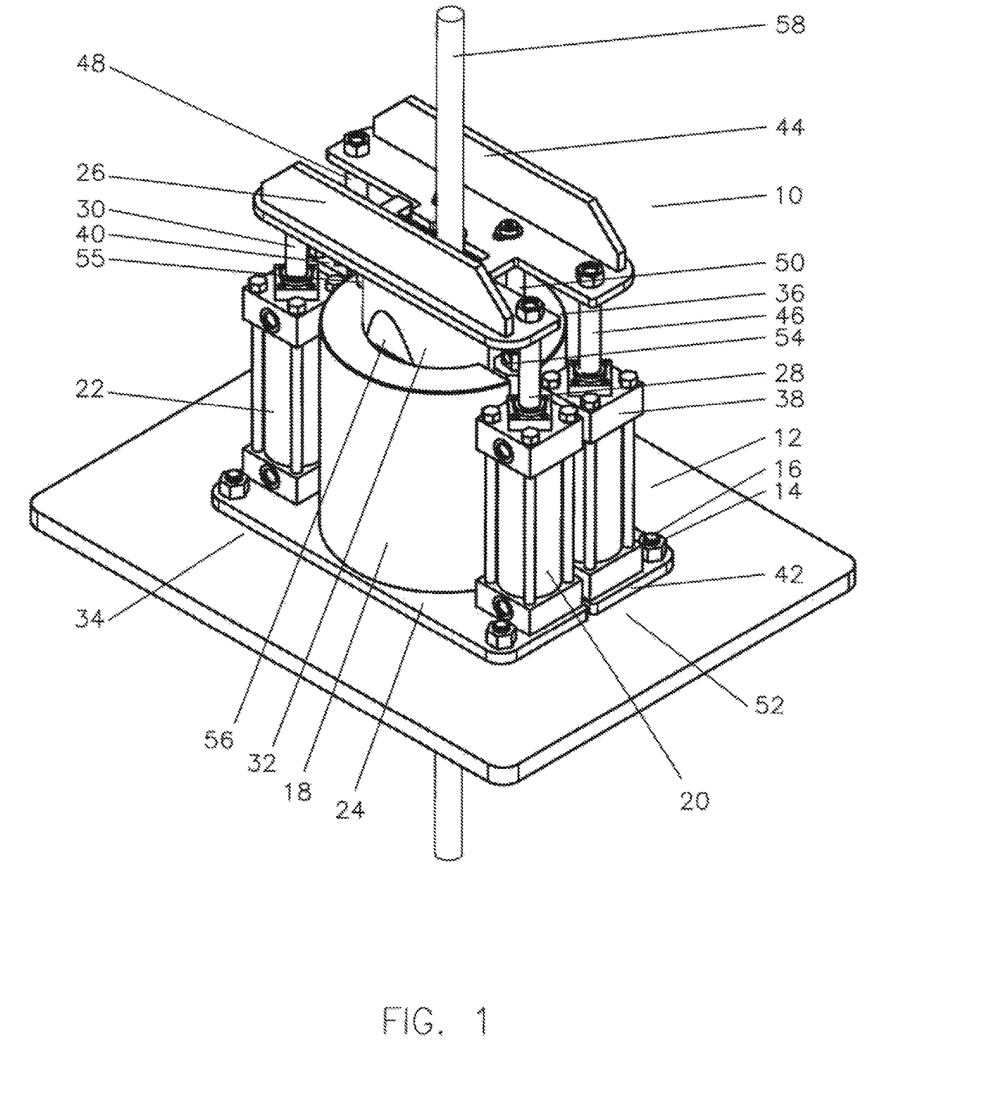
FIG. 1 is a perspective view of a slip assembly using the present invention in an open (not gripping the pipe) position.

Referring now to FIG. 1, a perspective view of a slip assembly 10 is shown landed on a support 12 and fixed with nuts 14 and bolts 16. Bowl half 18 and cylinders 20 and 22 are connected to base plate half 24, actuator plate 26 attaches to cylinder rods 28 and 30 and carrier 32 attaches to actuator plate 26, all forming left bowl half assembly 34. Bowl half 36 and cylinders 38 and 40 are connected to base plate half 42, actuator plate 44 attaches to cylinder rods 46 and 48 and carrier 50 attaches to actuator plate 44, all forming right bowl half assembly 52.

When nuts 14, bolts 16, and bowl pins 54 and 55 are removed, left bowl half assembly 34 and right bowl half assembly 52 can be separated to pass larger objects.

Surface 56 on carrier 32 is a flat surface inclined at eight degrees from the centerline of the umbilical 58 passing through the slip assembly 10. This is the same eight degrees as is conventionally used in conical bowls with oilfield slips, however, in this case it is a flat surface. Within bowl half 18 is a similar eight degree surface (not shown) for engagement by a surface similar to surface 56. When cylinder rods 28 and 30 are retracted, actuator plate 26 is lowered, and carrier 32 moves downward and inward at the eight degree angle.

Figure 2:
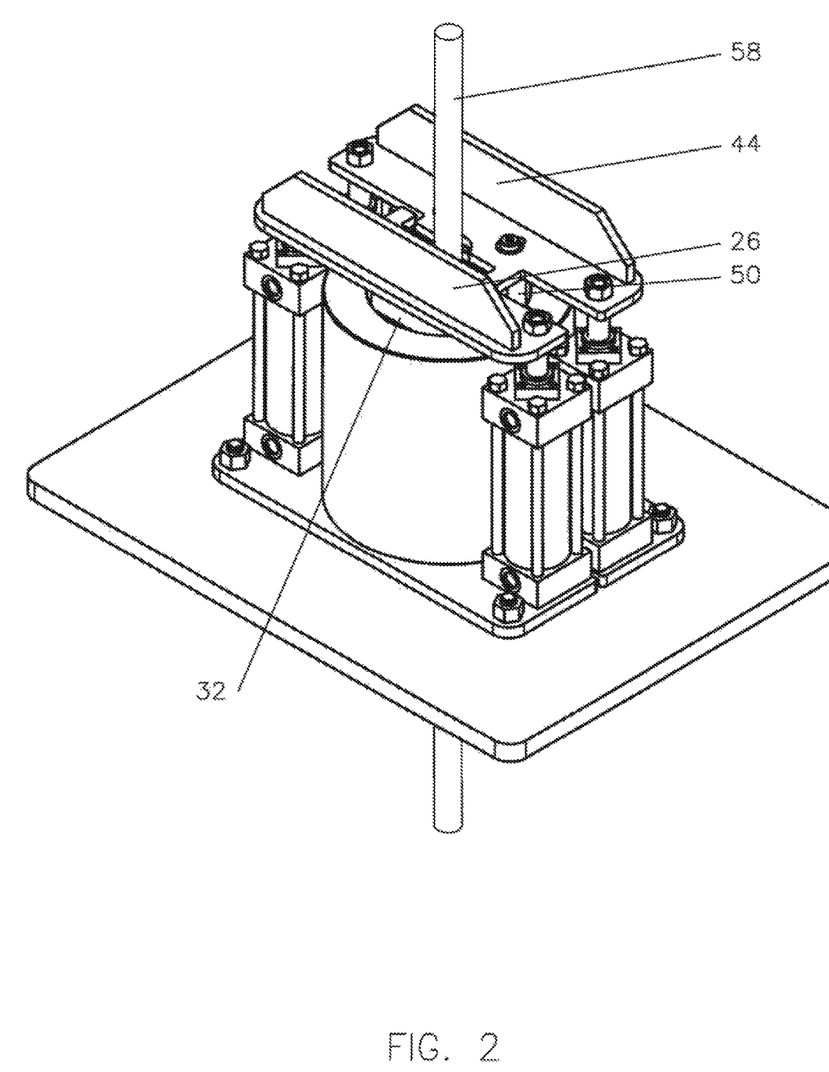
FIG. 2 is a similar perspective as illustrated in FIG. 1 but in the closed (gripping the pipe) position.

Referring now to FIG. 2, actuator plates 26 and 44 have been lowered and have lowered the carriers 32 and 50 such that internal parts (to be seen) engage the umbilical 58.

Figure 3:
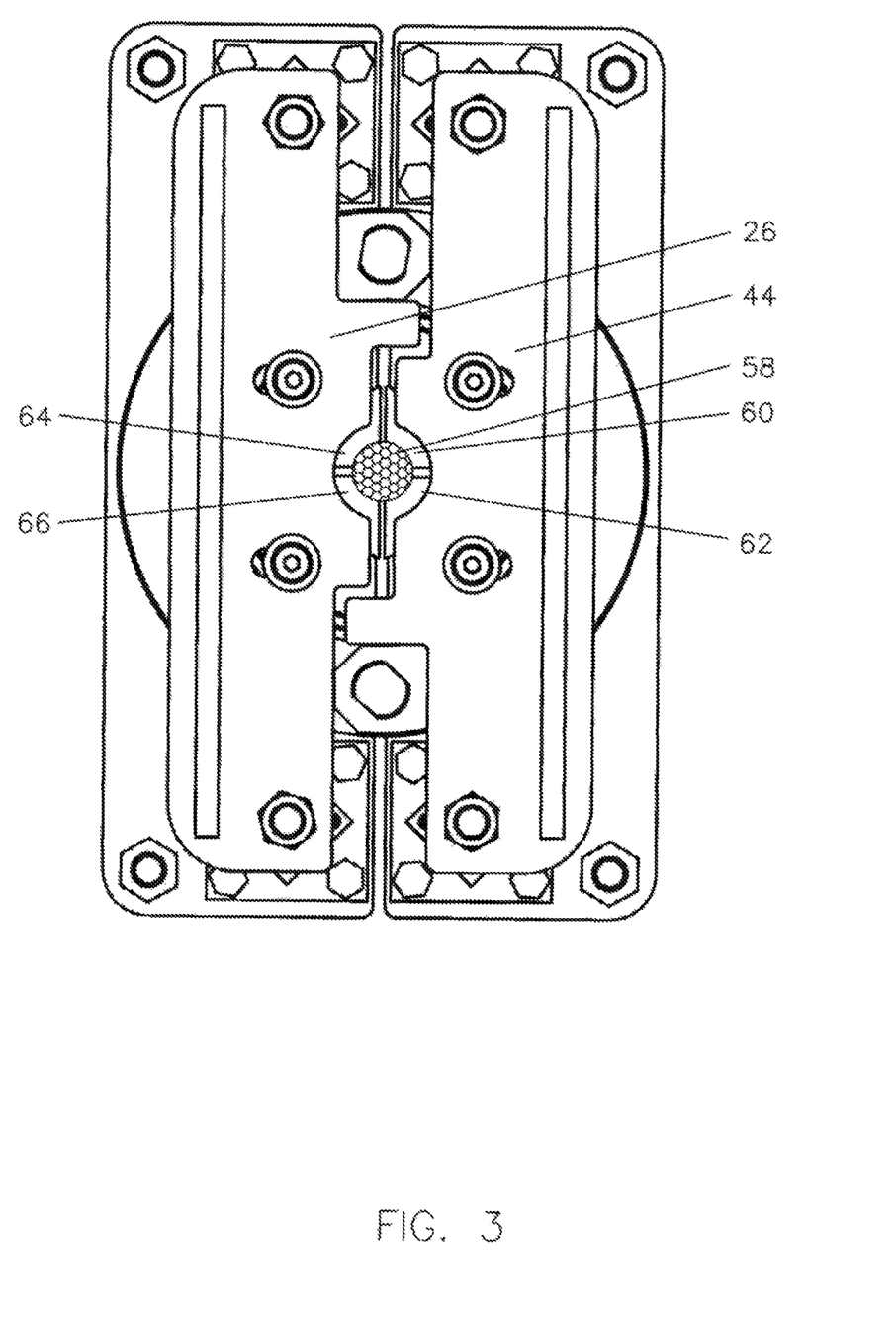
FIG. 3 is a top view of the arrangement of FIG. 2.

Referring now to FIG. 3, a top view of FIG. 2 is shown indicating that friction dogs 60 and 62 of right bowl half assembly 52 and friction dogs 64 and 66 of left bowl half assembly 34 are engaging umbilical 58.

Figure 4:
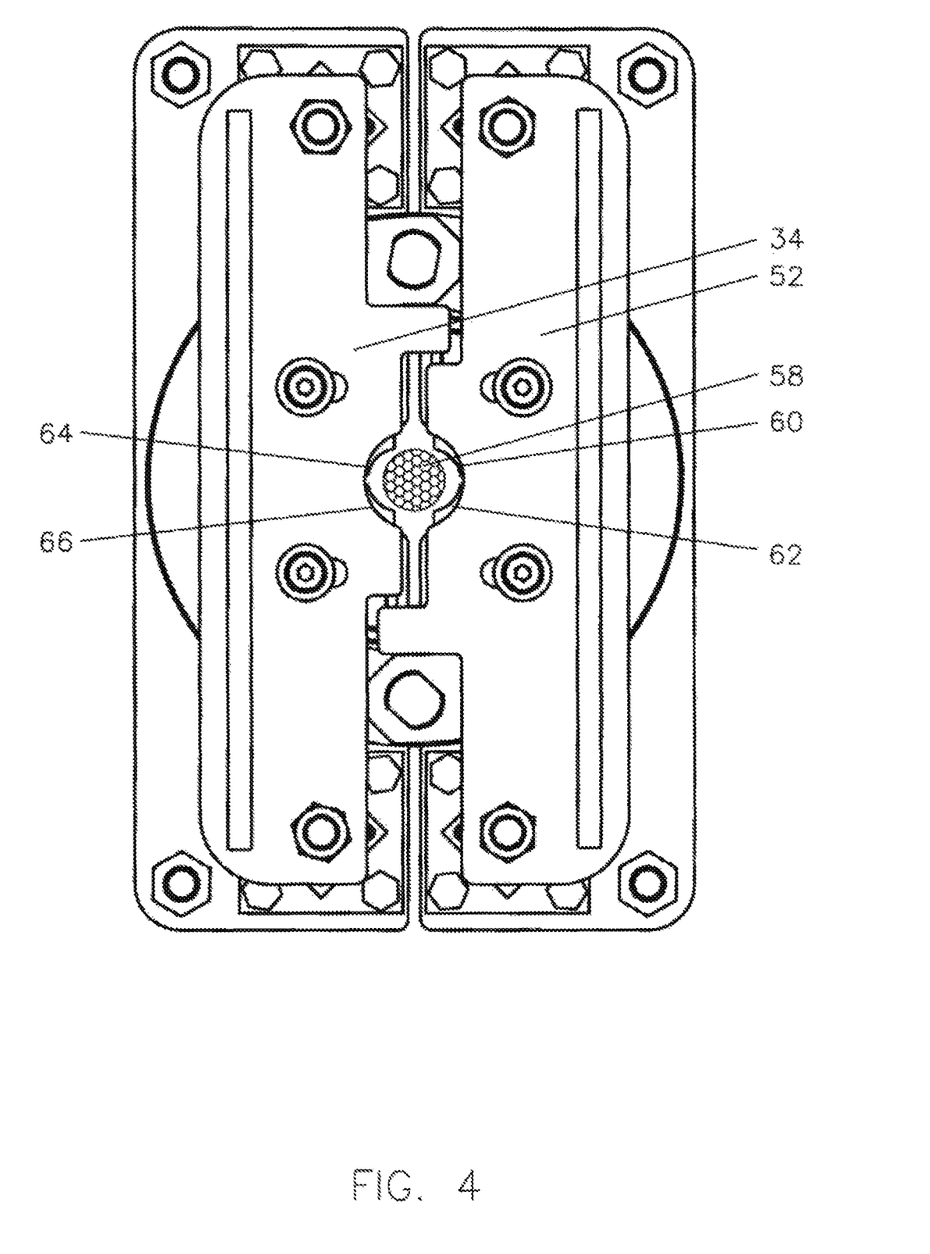
FIG. 4 a top view of the arrangement of FIG. 1.

Referring now to FIG. 4, a top view of FIG. 1 is shown indicating that friction dogs 60 and 62 of right bowl half assembly 52 and friction dogs 64 and 66 of left bowl half assembly 34 are retracted from umbilical 58, but not in a radial direction. The direction of the four individual friction dogs is not radially outward from the umbilical 58, but rather friction dogs 60 and 62 move radially to the right as a group and friction dogs 64 and 66 move radially to the left as a group. The vertical spacing (in this view) of friction dogs 60 and 62 as well as 64 and 66 remains the same, only the horizontal distance (in this view) changes. The friction dogs must be retained in this way to allow for the movement for load amplification by wedging.

Figure 5:
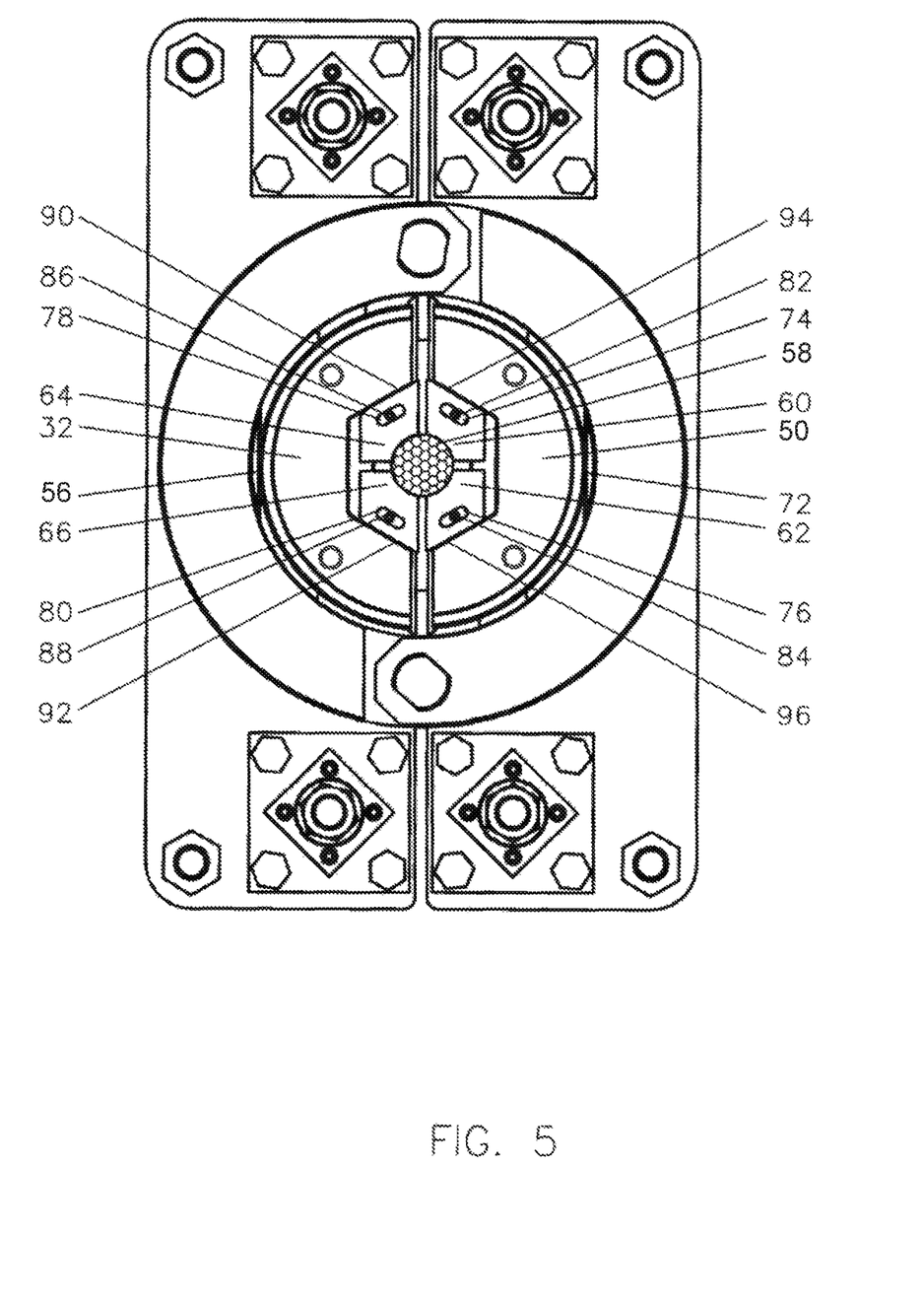
FIG. 5 is a top view as seen in FIG. 3, with the actuator plates

Referring now to FIG. 5, a top view similar to FIG. 3 is shown, except the actuator plates 26 and 44 have been removed. When carrier 32 moves down eight degree inclined surface 56, it moves to the right (in this view). Similarly when carrier 50 moves down eight degree inclined surface 72 (similar to surface 56) it moves to the left (in this view). Friction dogs 60, 62, 64, and 66 have slots 74, 76, 78, and 80 respectively on the upper end as seen and comparable slots on the opposite or lower end. Guide pins 82, 84, 86, and 88 project down from actuator plates 26 and 44 (not seen) into slots 74, 76, 78, and 80 to retain the friction dogs 60, 62, 64, and 66 in position. As seen the slots 74, 76, 78, and 80 are proximately centered on guide pins 82, 84, 86, and 88. It can be appreciated that as carriers 32 and 50 approach friction dogs 64, 66, 60, and 62 respectively, for wedging force amplification to occur at interfaces 90, 92, 94, and 96, the slots 74, 76, 78, and 80 must be free to slide relative to guide pins 82, 84, 86, and 88.

Figure 6:
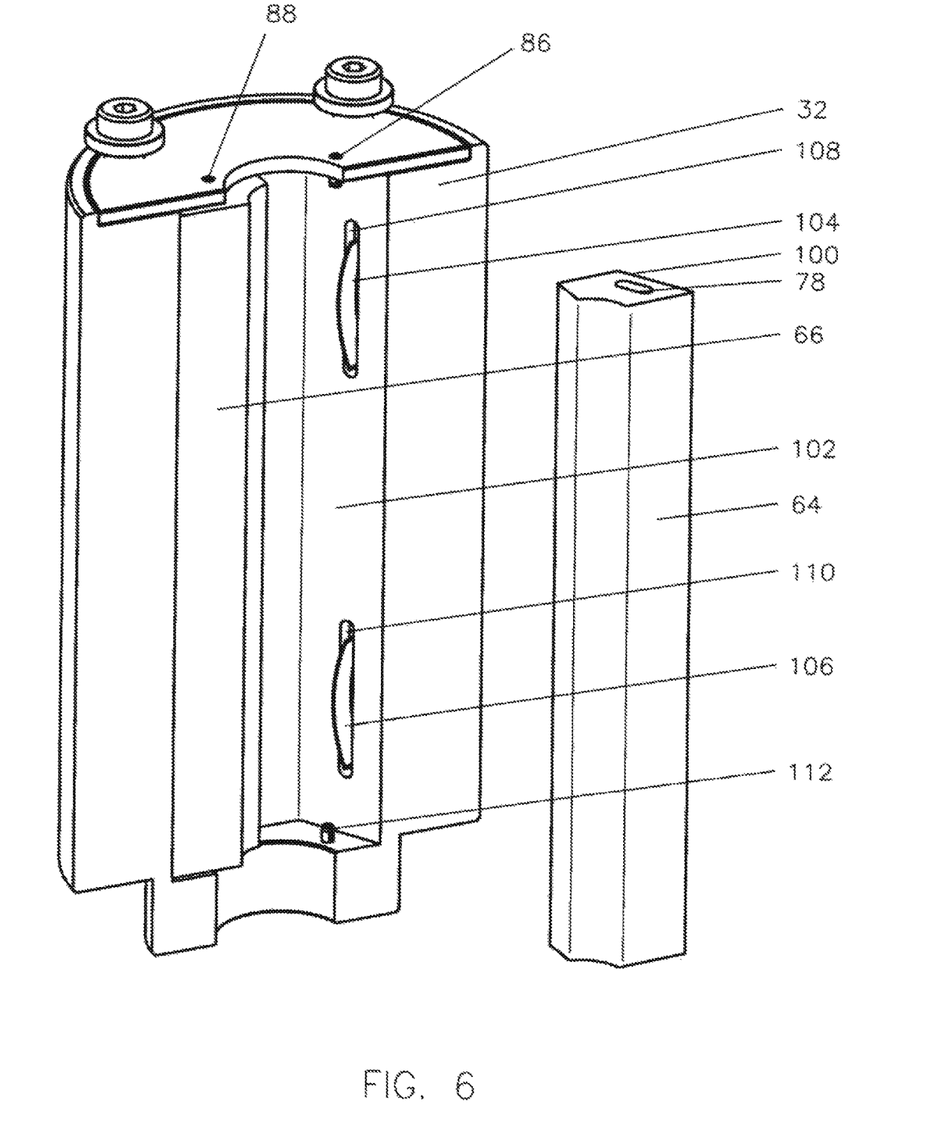
FIG. 6 is a perspective view of a carrier with one of the slip dogs

Referring now to FIG. 6, carrier 32 is shown removed from left bowl half assembly 34, friction dog 66 remains in place and friction dog 64 is displaced out for clarity. Surface 100 on the backside of friction dog 64 engages surface 102 of carrier 32. Leaf spring washers 104 and 106 are provided in grooves and or slots 108 and 110. Guide pin 112 engages a slot on the lower end of friction dog 64 as guide pin 86 engages slot 78 on the top side of friction dog 64.

Figures 7, 8:
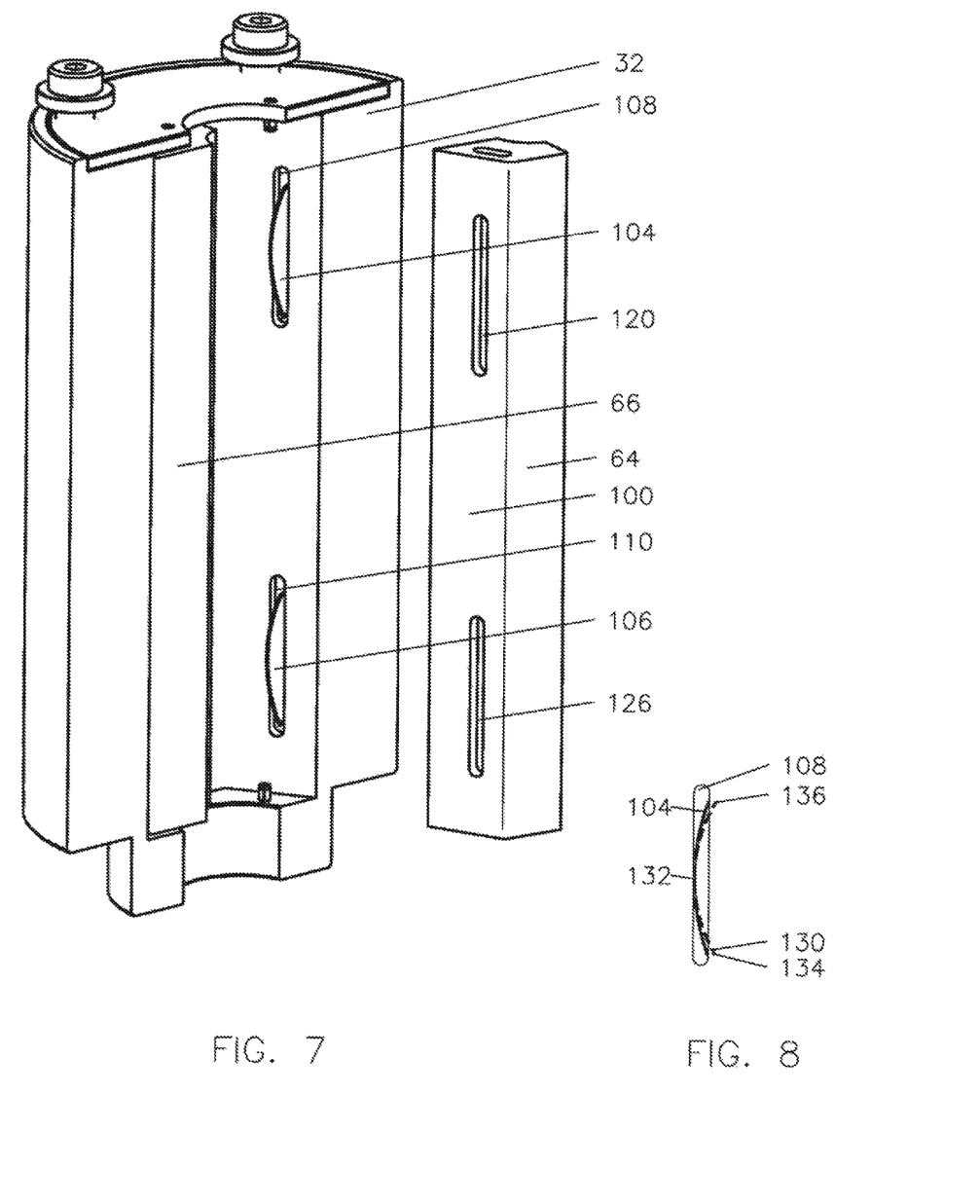
FIG. 7 is a perspective view similar to FIG. 6, with the slip dog rotated to show the slots on the mating surface.
FIG. 8 is a view of a slot with a leaf spring bent and installed as well as a view of an unbent leaf spring.

Referring now to FIG. 7, a view is seen similar to FIG. 6 except friction dog 64 is rotated approximately 180 degrees, showing slots and or grooves 120 and 126. These slots are similar to slots and or grooves 108 and 110 and engage the leaf spring washers 104 and 106 as slots and or grooves 108 and 110 do when in the assembled condition.

Referring now to FIG. 8, leaf spring 104 is shown as it was seen in FIGS. 6 and 7. Leaf spring 130 illustrates how the leaf spring 104 is made, or as it is in its unloaded or free state. This indicates that when leaf spring 104 is inserted into the grooves or slots such as groove 108 and or slot 108, it is already bent or preloaded some. The purpose of this is that if the friction dog is displaced one way or the other from the predetermined position, normal frictional forces will act against its movement back to the predetermined position. If the leaf spring is manufactured in the shape as indicated by leaf spring washer 104, its force would go to zero as the friction dog approaches the predetermined position, so it would not quite get there. It would return to almost the predetermined position from whichever side it is approaching. By preloading the leaf spring, it will have enough force to move all the way to the predetermined position from either side. The objective is to have enough force to move it all the way back to the predetermined position, combined with a low spring constant so the spring force has minimal impact to move off center during the wedging process as the carrier moves forward.

As a friction dog is displaced in a first direction, central portion 132 of the leaf spring 104 will load against the slot in the carrier and the ends of leaf spring 134 and 136 will load against the slot in the friction dog to urge the friction dog back towards the predetermined position. When the friction dog is displaced in the opposite direction, the central portion 132 of the leaf spring 104 will load against the slot in the friction dog and the ends of the leaf spring 134 and 136 will load against the slot of the carrier to urge the friction dog back towards the predetermined position. In this way the same leaf spring acts to move the friction dog back to the predetermined position from either direction, plus provides a residual force to keep it there until it is required to move by interaction with the umbilical.

Some options for the leaf spring with a single bend could be a wave washer comprising several bends, rubber, and coiled springs.

It is therefore contemplated that the invention may provide in two or more friction dogs for the gripping engagement of a circular member, the method of pre-positioning said friction dog in a predetermined position before said engagement with said circular member, comprising providing two more carriers which move radially inward towards said circular member when said circular member is to be engaged, providing two first surfaces on said two or more carriers at said first angle relative to the direction of movement towards said circular member, said two first surfaces being at proximately mirror angles about the direction of movement of said two or more carriers, providing a second surface on said one or more friction dogs for engaging one of said first surfaces on said carrier, providing a third surface on said two or more friction dog proximately opposite from said second surface for contacting said circular member, providing said first angles are wedging acute angles such that when a first load is placed on said one or more carriers to press said friction dogs against said circular member, said first load against said circular member is wedging amplified to be greater than said load against said carrier, providing a first groove in said first surfaces which is proximately parallel to the centerline of said circular member, providing a second groove in said second surfaces which is proximately parallel to the centerline of said circular member, providing when said friction dog is in said predetermined position said first groove and said second groove are aligned, placing a resilient member in both said first groove and said second groove, said leaf spring having a preload when said first groove and said second groove are aligned, such that if said friction dog is displaced from said predetermined position it is urged back towards said predetermined position and such that when said friction dogs are pressed against said circular member by said first load, sliding movement of said friction dogs along said first surface is allowed to allow said wedging amplification, wherein said resilient member is a leaf spring, said resilient member is a wave washer, said resilient member is a rubber type material, said first load is provided by hydraulic pressure, said first load is provided by springs, said first load is provided by a tapered surface, said third surface on said friction dogs is a smooth surface, said third surface on said friction dogs comprises sharp teeth, and so forth.

It is also contemplated that the invention may provide a method of controlling the position of slip member prior to engaging a tubular member in a first direction comprising providing a first slip member surface for contacting said tubular member, providing a second slip member surface proximately on the opposite side of said slip member from said first slip members surface, said second slip member surface being at a skewed angle relative to said first direction, providing carriers having a carrier support surface mounted at said skewed angle, contacting said carrier support surface with said second slip member surface such that said slip member is allowed to slide perpendicularly relative to the centerline of said tubular member during the engaging process, providing a first groove in said second slip member surface proximately parallel to the centerline of said tubular member, providing a second groove in said carrier support surface proximately parallel to the centerline of said tubular member, providing a resilient member which engages said first groove and said second groove to urge said slip member to a predetermined position on said carrier relative to said centerline of said tubular member, such that said slip member is urged to a predetermined position on said carrier support surface prior to engaging said tubular member, providing a first force in said first direction to engage said slip member with said tubular member, such that after said slip member engages said tubular member, said slip member is able to move along said carrier support surface to amplify the normal force of said slip member against said tubular member to be greater than said first force, wherein said resilient member is a leaf spring, said resilient member is a wave washer, said resilient member is a rubber type material, said first load is provided by hydraulic pressure, said first load is provided by springs, said first load is provided by a tapered surface, said third surface on said friction dogs is a smooth surface, said third surface on said friction dogs comprises sharp teeth, and so forth.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. Using two or more friction dogs for the gripping engagement of an umbilical, the method of pre-positioning said two or more friction dogs in a predetermined position before said engagement with said umbilical, comprising:

providing a base plate and one or more bowl halves attached to said base plate wherein said bowl halves are adjacently located to form a complete bowl and the interior of said bowl being conically shaped, providing one or more hydraulic cylinders and said one or more hydraulic cylinders attached to said base plate and each one or more hydraulic cylinders containing a cylinder rod, providing one or more actuator plates attached to said cylinder rods, providing two or more carriers and said two or more carriers in communication with said one or more actuator plates, providing when said one or more hydraulic cylinders retract said cylinder rods then said one or more actuator plates exert a downward force on said two or more carriers which move down and radially inward towards said umbilical when said umbilical is to be engaged, providing an exterior carrier surface on each of said two or more carriers each having a first carrier angle relative to the direction of movement towards said umbilical, said exterior carrier surface of each of said two or more carriers being at proximately mirror angles about the direction of movement of said two or more carriers, providing said first carrier angle being complementary to the conical shape of said interior of said bowl, providing a first friction dog surface on each of said two or more friction dogs for engaging an interior carrier surface on said two or more carriers, providing a second friction dog surface on each of said two or more friction dogs proximately opposite from said first friction dog surface for contacting said umbilical wherein said second friction dog surface is a smooth surface, providing said first carrier angle of each of said two or more carriers are wedging acute angles such that when a first load is placed on said two or more carriers to press said two or more friction dogs against said umbilical creating a second load, said second load against said umbilical is wedgingly amplified to be greater than the load against said two or more carriers, providing a first groove in said interior carrier surface of each of said two or more carriers which is proximately parallel to the centerline of said umbilical, providing a second groove in said first friction dog surfaces which is proximately parallel to the centerline of said umbilical, providing when said two or more friction dogs are in said predetermined position said first groove and said second groove are aligned, and placing a resilient member in both said first groove and said second groove, said resilient member having a preload when said first groove and said second groove are aligned, such that if said two or more friction dogs are displaced from said predetermined position they are urged back towards said predetermined position such that when said two or more friction dogs are pressed against said umbilical by said second load, sliding movement of said one or more carriers along said exterior carrier surface is capable to allow said wedging amplification.

2. The method of claim 1 further comprising said resilient member is a leaf spring.

3. The method of claim 1 further comprising said resilient member is a wave washer.

4. The method of claim 1 further comprising said resilient member is a rubber type material.

5. The method of claim 1 further comprising said second load is provided by a tapered surface.

* * * * *